Figure 1:
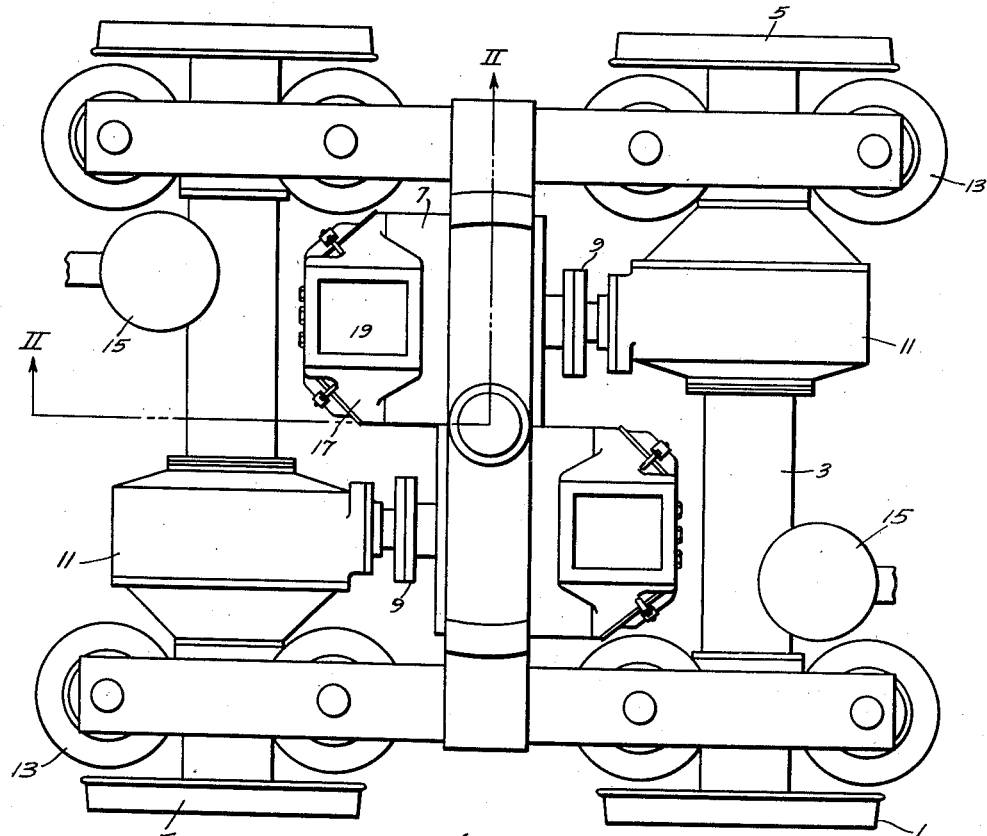

May 7, 1940.     E. O. MUELLER     2,200,119
ENCLOSURE FOR RAILWAY MOTORS
Filed Jan. 29, 1938     3 Sheets-Sheet 1

WITNESSES:
C. J. Weller.
B. L. Zangurl

INVENTOR
Erich O. Mueller.
BY O. B. Buchanan
ATTORNEY

May 7, 1940.  E. O. MUELLER  2,200,119
ENCLOSURE FOR RAILWAY MOTORS
Filed Jan. 29, 1938  3 Sheets-Sheet 2
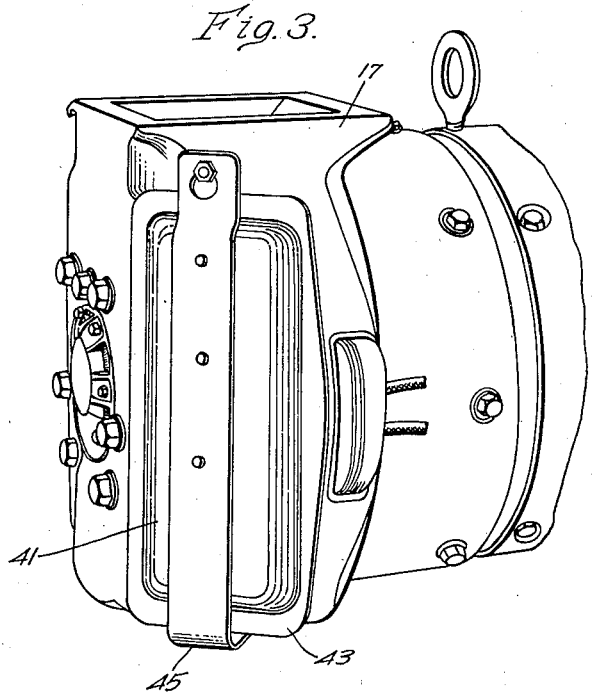
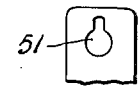
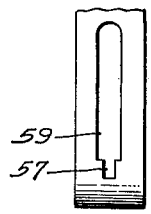
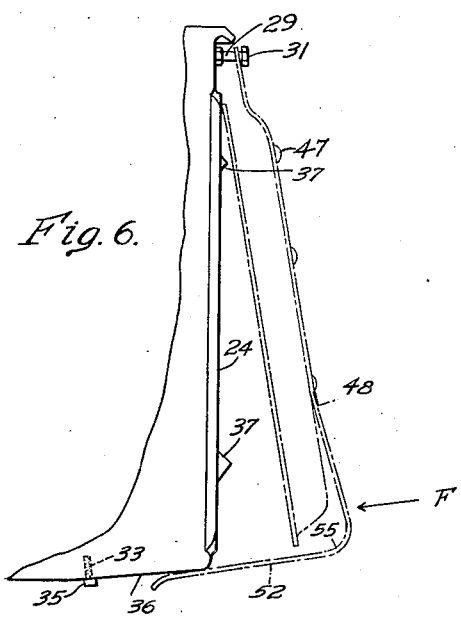
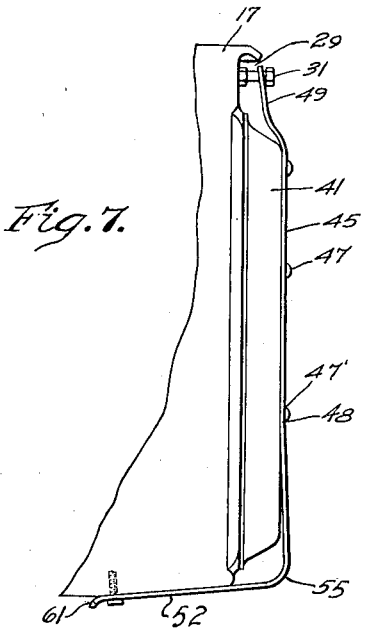
WITNESSES:
C. J. Weller.
B. L. Zangwill.
INVENTOR
Erich O. Mueller.
BY O. B. Buchanan
ATTORNEY May 7, 1940.  E. O. MUELLER  2,200,119
ENCLOSURE FOR RAILWAY MOTORS
Filed Jan. 29, 1938  3 Sheets-Sheet 3

WITNESSES:
C. J. Weller.
B. L. Zangwill.

INVENTOR
Erich O. Mueller.
BY O. B. Buchanan
ATTORNEY

Patented May 7, 1940

2,200,119

UNITED STATES PATENT OFFICE 2,200,119

ENCLOSURE FOR RAILWAY MOTORS

Erich O. Mueller, Irwin, Pa., assignor to Westinghouse Electric & Manufacturing Company, East Pittsburgh, Pa., a corporation of Pennsylvania Application January 29, 1938, Serial No. 187,705

22 Claims. (Cl. 172—286)

In electric traction cars of the modern type, the driving motors are usually mounted on the wheel trucks. The space available on such trucks is limited on the one hand by the distance between wheel axles, and on the other hand by the car underframe and clearance required above ground. Even this limited space is made all the more meager by the truck frame. Into this space must be crowded a large number of devices necessary for the support and control of the car of which the brakes and springs, the motors and gearing, are examples. Manifestly, all units must be designed for a maximum of rating with a minimum of cubic content and in view of the hard usage to which such units are subjected, it is one of the requirements of an assembly of them on a truck that they be made easily replaceable and readily accessible. This is particularly true of the driving motor, the brushes and commutator of which require frequent inspection and sometimes repair.

It is, accordingly, an object of my invention to provide a motor located with respect to the truck that will enable ready access to the aforesaid parts thereof, and more particularly to provide cover plates therefor which are easily removed and replaced, and by a simple operation accomplished at an accessible point.

It is a further object of my invention to design the commutator end housing and its cover plates so that a minimum of space is occupied. I do this by providing openings in the end housing through which some parts of the motor, such as the brush-holders, may be designed to protrude, and bulging the cover to encompass the protruding parts.

It is still another object of my invention to have a cover plate that will spring away from the aforesaid openings when the fastening means therefor is loosened. This will prevent damage to the protruding parts when the cover plate is being removed, and also has other manifest advantages. I accomplish this by means of a spring element designed for the purpose.

Figure 2:
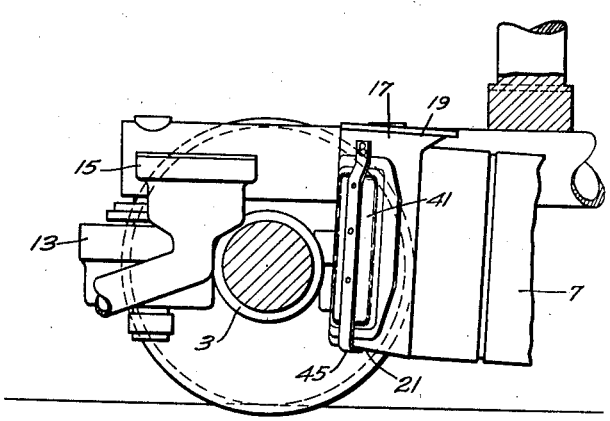
Figure 5:
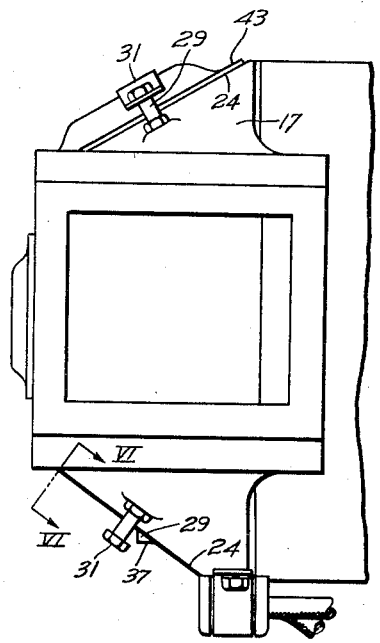
Figure 4:
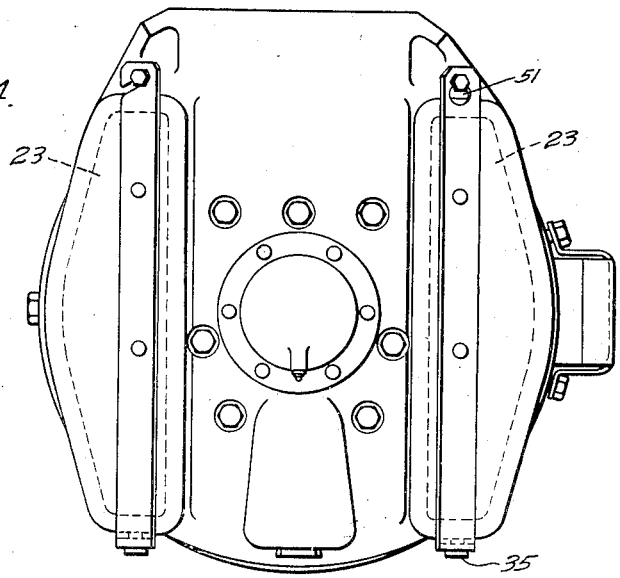

Other objects and novel features and elements of my invention will be apparent from the following description of one specific embodiment thereof which is required by the patent statutes and in the drawings of which:

Figure 1 is a top plan view of a part of a railway car truck showing generally some of the necessary control units for the car. Much of the truck frame supporting the elements has been omitted for the sake of clarity, Fig. 2 is a section along the line II—II of Fig. 1, looking in the direction of the arrows, Fig. 3 is a perspective view of part of a motor showing my novel cover plate, Fig. 4 is an end view of a motor embodying my invention with respect to the cover plates, Fig. 5 is a part plan view of the same with one cover removed to show the protruding parts, Fig. 6 is a view on the line VI—VI of Fig. 5, looking in the direction of the arrows with the cover plate shown in non-secured position by the broken lines, Fig. 7 is a side view of the plate and spring mounted thereon, and Figs. 8 and 9 are views of the apertures in the top and bottom ends of the spring, respectively.

Referring more particularly to Fig. 1, the car truck generally indicated at 1 supports in suitable bearings wheel axles 3 having wheels 5. The axles and wheels are driven from the motors 7 through appropriate driving mechanism which in the example shown includes couplings 9 and gear cases 11. Also supported by the truck are spring housings 13 and air cylinders 15 for the brakes. The frame supports additional units which it is deemed unnecessary to show for the reason that the parts thus far described are sufficient to indicate the problem faced in the design of a car truck having numerous control units thereon. In Figs. 1 and 2 no attempt has been made to show the frame members of the car truck which support the various control units. It is quite apparent that a maze of structures is present on the modern electric railway car truck and as may be observed in Fig. 2, very limited space is available for access to the end housing of the motor which is generally indicated by the reference character 17. While I have shown a particular type of motor mounted on the truck having an air intake 19—the supply ducts for which would further increase the maze of structures—it is quite obvious that any other type of motor may be substituted therefor.

In usual practice, the end housing of a motor is removable axially of the motor. However, the crowded condition of the parts in the car truck makes such removal inconvenient if not altogether impossible. As can be observed in Figs. 1 and 2, any attempt to remove the end housing 17 axially would be impossible, inasmuch as insufficient clearance is present between the end housing and the wheel axle 3. Attempts have been made to provide cover plates for openings in the housing, but insofar as I am aware, such cover plates have been fastened to the housing across the upper part of the motor parallel to the wheel axle 3. While this permits the cover plate to be removed, nevertheless the manipulation for such removal is accomplished with difficulty. Moreover, with the car underframe immediately above the truck, repair or inspection of the parts of the motor having a cover plate at the top thereof is a laborious task and can, at best, only be awkwardly accomplished. By providing a cover plate having the structural features hereinafter described, the fastening and unfastening thereof can be accomplished at the lower part of the motor. The angular disposition of the cover plates shown more specifically in Fig. 1, further facilitates access to the commutating parts.

Referring more particularly to Figs. 3 through 7, the motor end housing 17 has oppositely placed openings 23. The housing has flat machined surfaces 24 adjacent the periphery of these openings. A bolt 29 having a head 31 is secured by any appropriate means in the housing in proximity to an opening, and a bolt 33 having a head 35 is similarly secured to the housing at an end opposite to that of the bolt 29. In the particular modification shown, the openings 23 are elongated and the bolts 29 and 33 are secured to the housing at the extremities of the elongated part of the openings. In my specific motor, the bolt 29 is secured in a tapped hole in the housing 17, and is maintained in proper position by a lock nut. The shank of bolt 33, however, is preferably completely embedded in the housing with the head 35 suitably secured thereto, and flush against the surface. If desired, a head alone can be welded to the housing.

The housing 17 has what I prefer to call, a bearing face 36 extending somewhat horizontally below each opening, the purpose of which will be subsequently described.

Protruding through each of the openings are brushholders 37 and I cover these parts by cover plates 41. As shown, the cover plate 41 is bulged or dished to encompass the protruding brushholders. This bulging strengthens the cover plate and provides the necessary insulating clearance between brushholders and the cover plate to prevent flashover. Flanges 43 form the bottom of the cover plate and abut the flat machine surfaces 24 of the housing to form a seal.

Rigidly fastened to the top of the cover plate is a spring member 45 preferably of flat strip metal. I prefer to fasten the spring 45 to the cover plate 41 by rivets 47 and 47' along a substantial length thereof as better shown in Fig. 7. It is to be noted, however, that the lowermost rivet 47' is positioned at some distance above the bottom of the cover plate in order to provide a pivoting axis 48 for a purpose to be later described.

The spring is provided with an upwardly protruding end 49 having an inverted keyhole 51. The bolt head 31 can pass through the larger circle of the keyhole. When the cover plate is dropped, the smaller circle of the keyhole is in operative relation with the bolt to prevent lateral movement of the spring and cover. This type of fastening means, per se, and modifications thereof are well known. Two embodiments of the keyhole are shown in Fig. 4; one of which follows the form described whereby the cover plate is hung over the bolt, and the other provided with a cut slot in the flange somewhat larger than the shank of the bolt 29 so that the bolt may be slid therethrough, and terminating in a circular aperture. However, I so shape the protruding spring end member 49 and position the bolt head 31 so that when the cover plate is to be placed into position, it must be tilted at an angle as shown by the dashed lines of Fig. 6.

The lower end 52 of the spring member is bent to ride upon the aforesaid bearing face 36 of the housing. An angle or bend 55 is formed in the spring such that when this angle is pushed inwardly, the force applied and the spring portion 52 bearing upon the face 36 tend to pull the cover plate downward whereby the bayonet joint formed between bolt 29 and keyhole 51 is securely locked. Upon further inward movement of the spring end 52, the cover plate flange 43 is forced against the machine surfaces 24 of the housing 17 and held in frictional engagement therewith by the tension of the spring end 49. When the hole 57 in the spring portion 52 engages the head 35 of bolt 33, the cover becomes locked. The angle 55 is so formed that with the cover secured in position, the side 52 of the angle lies flat against the bearing face or surface 36.

In order to facilitate removal of the spring, I provide an enlarged opening 59 adjacent the hole 57. By inserting a screw driver or the like, into the hole and making it act as a lever, the spring side 52 may be disengaged from the head 35.

With the above described structure, I have provided a cover plate which can be removed very easily and can be equally as easily replaced. With the openings in the motor elongated and at an angle, ready access can be had to the commutating parts, as can be observed from Figs. 1 and 2.

I will now describe completely the manner in which the cover plate is attached and removed from the housing. Referring to Fig. 2, the cover plate may be slipped upwardly between the motor 7 and axle 3 and then tilted slightly until the bolt head 31 slides through the keyhole 51. The cover plate will now hang from the bolt 29 and in view of the relative positions of the bolt head 31 and the spring end 49, the cover plates will assume a position shown by the dashed lines in Fig. 6. It is now an easy matter to push against the bottom of the cover plate to lock the same against the machine surfaces 24. Force may be applied to the cover plate itself, but I prefer to apply a closing force to the angle 55. The closing force applied at this point first locks the bayonet joint between the spring end 49 and the bolt 29, and positions the cover plate until the flanges 43 rest against the machine surfaces 24. The spring end 49 is deformed by this action inasmuch as movement of the free end is prevented by bolt head 31. The continued application of force to the spring angle 55 tends to deform the same until the hole 57 engages the head 35 of bolt 33 and locks the cover plate thereto. Upturned lug 61 permits the spring to slide over head 35 and also provides an additional means for prying the cover loose. It will be observed that the two spring end members are both deformed and maintain the cover in its position over the opening by their clamping pressure.

I have found this cover plate and fastening means to be very satisfactory in practice and although a large number of such cover plates have been used on railway motors, I know of no instance in which a cover has been jarred loose.

The removal of the cover can be easily effected by prying the spring over the bolt head 35. The spring 45 tends to assume its normal shape and the cover plate springs outward to the dashed position shown in Fig. 6. All that is necessary then to entirely remove the cover plate is to lift the same from the bolt 29. This springing action in the removal of the cover plate is of particular advantage in avoiding damage to the protruding commutator parts.

The exact action which occurs when angle 55 is pushed for closure may be varied. Referring to Figs. 6 and 7, as one specific instance, the force F applied to the angle 55 will tend to move the cover plate clockwise around bolt 29. Since the upper edge of the cover plate flange cannot rotate any appreciable distance, it slides on surfaces 24 and becomes the pivot upon which the cover turns. This turning movement produces a deformation of spring end 49 abutting bolt head 31. The resulting forces tighten the bolt 29 in the smaller hole. The tightening action is maintained by spring portion 52 sliding on the bearing face 36 in a manner tending to spread the angle 55. When the cover plate is in proper position, further application of the force F to the angle 55 deforms the spring at its lower end, tending to turn this end clockwise about an axis substantially at 48. When the spring latches or locks over head 35, the spreaded angle 55 exerts a downward force helping to keep the upper bayonet joint locked and the two deformed ends of the spring maintain the cover plate clamped against the end housing.

While I have illustrated my invention in the form which I now believe to be the best mode of application thereof, it is obvious that many changes may be made which are within the spirit and scope of my invention. I do not desire to be limited to the exact form of spring shown, except insofar as required by the prior art and I desire that the appended claims be given their broadest construction for the general purposes of the invention which I have introduced. Thus, for example, while I employ the term "motor," it is obvious that the element 11 may be driven and thereby will become a generator. Accordingly the term "motor" is intended to embrace other forms of electro-dynamic machines.

I claim as my invention:

1. In an electric railway car truck having a frame, an axle mounted therein, motor means for driving said axle including a housing having an opening accessible only from a limited space of said truck, a cover plate for said opening adapted to be removed without the use of tools, means comprising a normally loose joint for removably suspending said cover plate at a point removed from said space, and means for fastening said cover plate operable at said accessible space, whereby the cover may be easily fastened in place or removed.

2. A combination as defined above, the last named means comprising spring means whereby said cover plate is held in place by spring pressure.

3. In an electric railway car truck having a frame, an axle mounted therein, motor means for driving said axle including a housing having an opening accessible only from a limited space of said truck, a cover plate for said opening adapted to be removed without the use of tools, means comprising a normally loose joint for removably holding said cover plate at the portion removed from said space, said last means being springy so that the cover plate tends away from said opening.

4. The combination as defined in claim 1 wherein the general axis of said opening is at an angle to a horizontal axis.

5. In an electric railway truck having a frame, an axle mounted therein, motor means for driving said axle including a housing having a vertically-directed opening accessible only from a limited space of said truck, a cover plate for said opening adapted to be removed without the use of tools, means comprising a joint for removably suspending said cover plate at the portion removed from said space, said last means being springy so that the cover plate tends away from said opening, and means at said accessible space for securing said cover plate in position, the last named means comprising spring means whereby said cover plate is held in place by spring pressure.

6. In an electric railway car truck having a frame, an axle mounted therein, motor means for driving said axle including a housing having an opening accessible only from a limited space of said truck, a cover plate for said opening, flat spring means fastened to said cover plate and having ends protruding from opposite parts thereof, one protruding end of said spring means and the housing having parts forming a normally loose joint at an inaccessible point, the other protruding end of said spring and said housing including means for first locking said joint and then fastening said cover in place.

7. An electric motor comprising an end housing having an opening, a cover plate for said opening, a normally loose joint having cooperating parts on said plate and end housing, and means for first locking said joint and then fastening said cover plate in place by spring action.

8. An electric motor comprising an end housing having an opening, a cover plate for said opening, means comprising a normally loose joint for positioning said plate on said housing at one part thereof, said means being springy so that the plate tends away from said opening, and means for fastening said cover in place operable at an opposite part thereof with respect to said first part.

9. The motor defined in claim 7 wherein the general axis of said opening is at an angle to the axis of the motor.

10. The motor defined in claim 8 wherein the general axis of said opening is at an angle to the the axis of the motor.

11. An electric motor comprising an end housing having an opening, a cover plate for said opening, flat spring means fastened to said cover plate and having ends protruding from opposite sides thereof, one protruding end and the housing having parts forming a normally loose joint, the other protruding end comprising means for locking said joint and fastening said cover whereby the cover is held in place by spring action.

12. The motor defined in claim 11 wherein the general axis of said opening is at an angle to the axis of the motor.

13. An electric motor comprising an end housing having an opening with a general axis at an angle to the axis of said motor, a cover plate for said opening, a flat spring element at one end of said cover plate, a lock comprising a slot in said spring element and a cooperating bolt on said housing, a second spring element at the other end of said cover plate, said second spring element having a slot, a cooperating bolt on said housing, the second said slot and bolt forming a latch displaced inwardly of the opening, whereby when the second spring element is pushed it will first lock the said lock, and then secure the cover plate in place with both springs deformed.

14. An electric motor comprising an end housing having an opening with parts of the motor protruding therethrough, a bulged cover plate for said opening, a flat spring element at one end of said cover plate, a lock comprising a slot, in said spring element and a cooperating bolt on said housing, a second spring element at the other end of said cover plate, said housing having a surface at an angle to the general axis of said opening, extending from said opening, and cooperating with said second spring element, a bolt at a distance from the periphery of said opening and substantially at the end of said surface remote from said opening, said second spring element being formed with a part to bear against said surface, and said second spring element having a slot therein whereby the cover plate may be positioned by the first said lock and when the second spring element is pushed it will lock the first said lock while the cover plate tends away from said opening, and then latch the cover plate in place.

15. The motor defined in claim 14 wherein the general axis of said opening is at an angle to the axis of the motor.

16. An electric motor comprising an end housing having an opening with a general axis at an angle to the axis of the motor, a cover plate for said opening, and means frictionally to hold said cover plate in place by spring action.

17. An electric motor comprising an end housing having an opening, a rigid cover plate for said opening, means to hold one end of said cover plate by spring action biasing the cover plate away from said opening, and means comprising parts at the other end of said cover plate to fasten said cover plate in place against said spring action.

18. An electric motor comprising an end housing having an opening, a cover plate for said opening, means comprising a normally loose joint for positioning said plate on said housing, said housing having a bearing surface extending at an angle to said opening, and opposite said joint, spring means secured to said cover plate and including an angular portion having one side bent away from said cover plate and the other side extending to slide on said bearing surface, said spring means and housing having cooperating fastening means whereby said cover plate can be clamped in position with the angle of said angular portion spread.

19. The structure defined in claim 18 wherein said fastening means comprises a bolt head on said housing, and an aperture in said other side for locking over said bolt head.

20. The structure defined in claim 18 wherein said fastening means comprises a bolt head on said housing, and an aperture in said other side for locking over said bolt head, said aperture being elongated.

21. A cover plate for a motor end housing comprising a dished member having a surrounding flange, flat spring elements fastened to said member and having ends protruding from opposite sides of said member, one of said spring ends formed with an aperture adapted to engage a bolt or the like on the motor housing, and the other end formed with fastening means.

22. A spring element for clamping a motor cover plate comprising a flat spring metal having an aperture at one end adapted to engage a bolt or the like on the motor housing, the lower end of said spring having an angular portion with one side thereof bent slightly from the main body of the spring and the other side extending in a direction substantially at right angles to said one side, said other side having an elongated aperture therein.

ERICH O. MUELLER.